June 12, 1945.  H. W. WARREN  2,377,911
PALLET
Filed Sept. 7, 1944  2 Sheets-Sheet 1
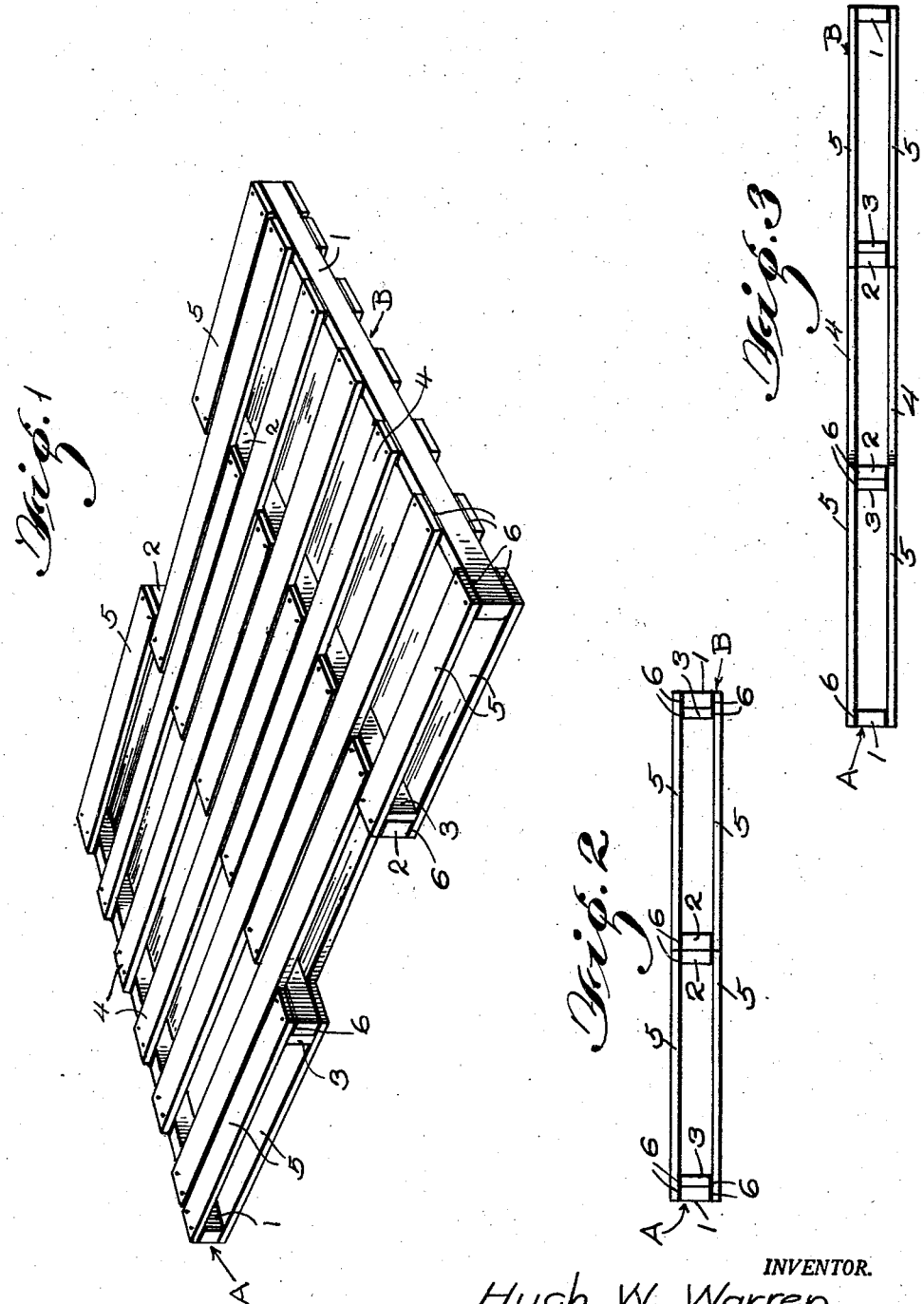
INVENTOR.
Hugh W. Warren
BY
William F. Dumond
ATTORNEY June 12, 1945.  H. W. WARREN  2,377,911
PALLET
Filed Sept. 7, 1944  2 Sheets-Sheet 2

INVENTOR.
Hugh W. Warren
BY
William F. Diamond
ATTORNEY

Patented June 12, 1945

2,377,911

UNITED STATES PATENT OFFICE 2,377,911

PALLET

Hugh W. Warren, Derita, N. C.

Application September 7, 1944, Serial No. 553,003

4 Claims. (Cl. 248—120)

(Granted under the act of March 3, 1883, as amended April 30, 1928; 370 O. G. 757)

The invention described herein, if patented may be manufactured and used by or for the Government for governmental purposes, without the payment to me of any royalty thereon.

This invention relates to pallets such as are now commonly used in and about warehouses for expediting the handling of freight and for insuring the utilization of a maximum amount of storage space available, without wastage.

At the present time it is usual to keep six or eight different sizes of pallets on hand in order to properly handle the great variety of goods passing through the warehouses. This large supply of pallets not only creates a storage problem for those not in use, but also constitutes a considerable financial outlay when it is recalled that thousands of each size are frequently necessary in the efficient handling of the goods.

It is a primary object of the present invention, therefore, to overcome the foregoing difficulties, and to this end a pallet has been devised which is capable of taking the place of any one of about six different sizes of the standard double-deck pallet.

More specifically, it is an object of the invention to provide a pallet which may be adjusted to provide a variety of deck areas so as to adapt it to different classes of goods being handled.

It is also an object of the invention to provide a double-deck pallet capable of assuming a variety of sizes without sacrificing the strength and rigidity of the conventional pallet of fixed size.

A further object of the invention resides in the provision of a pallet comprising relatively movable sections, and which is so designed and constructed as to avoid any possibility of binding of the parts when adjustments are being made.

Other objects and advantages of the invention will be apparent from the following description when taken in connection with the accompanying drawings, in which:

Figure 1 is a perspective view of the pallet, extended to provide the maximum area.

Figure 2 is an end view of the pallet in completely collapsed condition.

Figure 3 is a similar view of the pallet fully extended, and

Figure 4:
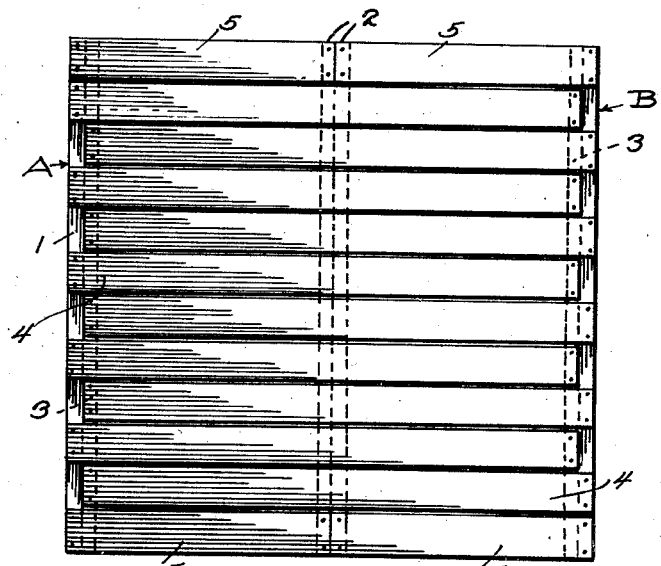
Figures 4 and 5 are plan views of the pallet in closed and extended positions, respectively.

As just mentioned, the present pallet is intended to be employed as a substitute for a variety of sizes of the conventional pallet, and to this end the pallet is composed of two extensible and substantially identical sections. These sections, which are designated A and B in Figure 1, are arranged to provide upper and lower decks, and are therefore reversible.

In the present embodiment of the invention each of the sections A and B is composed of a set of three stringers, 1, 2, and 3. The stringers 1 and 2 may be termed outer stringers as they are farthest removed from the other section of the pallet, and the stringer 3 may be termed the inner stringer. As will be noted, the inner stringer 3 of each of the pallet sections is interposed between stringers 1 and 2 of the other pallet section.

Spaced along the upper and lower faces of the three stringers of each section are deck boards 4, and at the outer ends of stringers 1 and 2 of each section are secured shorter deck boards 5. These deck boards 5 of the sections are arranged in alignment at opposite ends of the pallet, and are adapted to form, in effect, a single deck board when the sections are brought to collapsed or closed positions.

In order to insure free sliding movement between the sections regardless of weather conditions and the like, it is desirable that the deck boards be spaced slightly above and below the faces of the stringers to which they are attached, thereby providing for freedom of movement between the stringers of one section and the deck boards of the other section. For this purpose thin plywood blocks 6, or any other preferred spacing means, may be inserted between the upper and lower faces of the stringers and the respective deck boards attached thereto, and may be secured in position by the nails or other fastening means employed for attaching the deck boards to the stringers.

Figure 5:
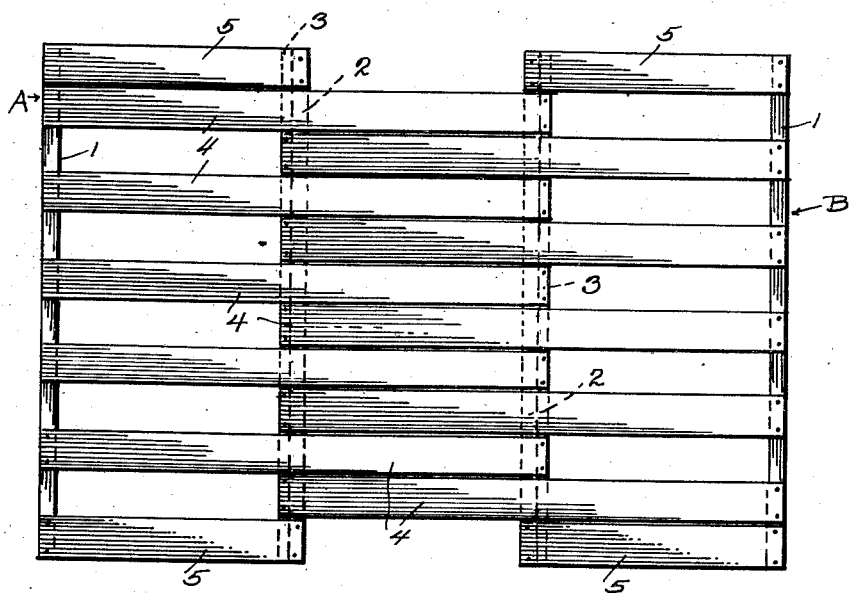

In operation, the pallet may be fully extended as shown in Figures 1, 3 and 5 so as to serve as a substitute for one of the larger pallets of standard make; it may be fully collapsed or closed as indicated in Figures 2 and 4 so as to form a substitute for the smallest pallet of standard design; or it may be adjusted to a variety of intermediate sizes when it is desired to be used as a substitute for other sizes of the standard pallet.

When the pallet is fully extended, the inner stringers 3 of each section engage the outer stringers 2 of the other section, thereby serving to limit the outward movement of the respective sections. On the other hand, when the pallet sections are moved to closed position to simulate the smallest pallets, the inner stringers 3 of each section engage the outer stringer 1 of the other section, and the stringers 2 of the section are brought together, thereby serving as a stop for the inner movement of the sections. When adjusted to this fully closed position to provide a pallet of the smallest possible area, as shown in Figures 2 and 4, the deck boards 5 are brought into abutting relationship, and the deck boards 4 of the two sections are substantially fully overlapped in a horizontal plane so as to produce a substantially uninterrupted surface throughout the area of the pallet.

This construction of an extensible pallet is sturdy and durable in operation in each of its several adjustments, but is especially so when adjusted to the smaller sizes in which the stringers and deck boards of the two sections cooperate and reinforce each other. It is to be noted also that by providing this adjustable pallet in two or three sizes the whole range of standard pallet sizes will be included, thereby providing an enormous saving in storage space.

From the foregoing description when considered in connection with the attached drawings, it will be observed that the present construction of the pallet may be readily adjusted to provide a variety of sizes and thereby avoid the necessity of maintaining a large variety of different sized pallets in stock; that this structural advantage is obtained without sacrificing strength or rigidity; that when adjusted to the smaller sizes the pallet is considerably stronger than the conventional design of pallet by reason of the reinforcing effects of the several stringers and deck boards when brought into closed relation, and that means have been provided to prevent binding of the parts during adjustment.

In accordance with the patent statutes, the preferred form of construction has been disclosed herein, however, inasmuch as various minor structural details may be altered without departing from the spirit of the invention, it is intended that all such alterations be included within the scope of the appended claims.

What is claimed is:

1. A pallet including separate sections, each section composed of spaced stringers and deck boards secured to the upper and lower faces of the stringers and extending transversely thereof, the deck boards of one section being arranged for longitudinal sliding movement relative to the deck boards of the other section, whereby the sections are relatively movable to vary the size of the pallet.

2. A pallet including separate sections, each section composed of spaced stringers and deck boards secured to the upper and lower faces of the stringers and extending transversely thereof, the deck boards of one section being staggered with respect to the deck boards of the other section and interposed therebetween, and a stringer of each section being interposed between stringers of the other section.

3. A pallet including separate sections, each section including an inner and two outer stringers and spaced deck boards secured to the upper and lower faces of the stringers and extending transversely thereof, the deck boards of one section being staggered with respect to the deck boards of the other section and arranged for sliding movement relative thereto, the inner stringer of each section being interposed between the outer stringers of the other section.

4. A pallet including separate sections, each section composed of spaced stringers and deck boards secured to the upper and lower faces of the stringers and extending transversely thereof, a stringer of one section being interposed between stringers of the other section, and spacing means between the deck boards and the stringers to which they are attached.

HUGH W. WARREN.